US010621463B2

(12) United States Patent
Adams et al.

(10) Patent No.: US 10,621,463 B2
(45) Date of Patent: Apr. 14, 2020

(54) SYSTEMS AND METHODS FOR PROCESSING IMAGES WITH EDGE DETECTION AND SNAP-TO FEATURE

(71) Applicant: Pictometry International Corp., Rochester, NY (US)

(72) Inventors: Steven Douglas Adams, Rush, NY (US); Yandong Wang, Webster, NY (US); Frank D. Giuffrida, Honeoye Falls, NY (US)

(73) Assignee: Pictometry International Corp., Rochester, NY (US)

( * ) Notice: Subject to any disclaimer, the term of this patent is extended or adjusted under 35 U.S.C. 154(b) by 0 days.

(21) Appl. No.: 14/341,213

(22) Filed: Jul. 25, 2014

(65) Prior Publication Data
US 2015/0078668 A1    Mar. 19, 2015

Related U.S. Application Data

(63) Continuation of application No. 12/972,088, filed on Dec. 17, 2010, now Pat. No. 8,823,732.

(51) Int. Cl.
*G06K 9/46* (2006.01)
*G06F 16/50* (2019.01)
(Continued)

(52) U.S. Cl.
CPC .......... *G06K 9/4604* (2013.01); *G06F 16/50* (2019.01); *G06T 3/0081* (2013.01); *G06T 7/12* (2017.01); *G06T 2207/30184* (2013.01)

(58) Field of Classification Search
CPC ... G06K 9/4604; G06T 7/12; G06T 17/30244; G06T 3/0081; G06T 2207/30184; G06F 17/30244
See application file for complete search history.

(56) References Cited

U.S. PATENT DOCUMENTS

| 2,273,876 A | 2/1942 | Lutz et al. |
| 3,153,784 A | 10/1964 | Petrides et al. |

(Continued)

FOREIGN PATENT DOCUMENTS

| AT | 331204 T | 7/2006 |
| BR | 0316110 | 9/2005 |

(Continued)

OTHER PUBLICATIONS

Author: Able Software Corp.; Title: R2V User's Manual; Date: Dec. 27, 2008; Source: http://web.archive.org/web/20081227004342/http://www.ablesw.com/r2v/R2Vmanual.pdf.*

(Continued)

*Primary Examiner* — Jwalant Amin
(74) *Attorney, Agent, or Firm* — Dunlap Codding, P.C.

(57) ABSTRACT

A method for creating image products includes the following steps. Image data and positional data corresponding to the image data are captured and processed to create geo-referenced images. Edge detection procedures are performed on the geo-referenced images to identify edges and produce geo-referenced, edge-detected images. The geo-referenced, edge-detected images are saved in a database. A user interface to view and interact with the geo-referenced image is also provided such that the user can consistently select the same Points of Interest between multiple interactions and multiple users.

9 Claims, 8 Drawing Sheets

(51) Int. Cl.
  *G06T 3/00* (2006.01)
  *G06T 7/12* (2017.01)

(56) References Cited

U.S. PATENT DOCUMENTS

| | | |
|---|---|---|
| 3,594,556 A | 7/1971 | Edwards |
| 3,614,410 A | 10/1971 | Bailey |
| 3,621,326 A | 11/1971 | Hobrough |
| 3,661,061 A | 5/1972 | Tokarz |
| 3,716,669 A | 2/1973 | Watanabe et al. |
| 3,725,563 A | 4/1973 | Woycechowsky |
| 3,864,513 A | 2/1975 | Halajian et al. |
| 3,866,602 A | 2/1975 | Furihata |
| 3,877,799 A | 4/1975 | O'Donnell |
| 4,015,080 A | 3/1977 | Moore-Searson |
| 4,044,879 A | 8/1977 | Stahl |
| 4,184,711 A | 1/1980 | Wakimoto |
| 4,240,108 A | 12/1980 | Levy |
| 4,281,354 A | 7/1981 | Conte |
| 4,344,683 A | 8/1982 | Stemme |
| 4,360,876 A | 11/1982 | Girault et al. |
| 4,382,678 A | 5/1983 | Thompson et al. |
| 4,387,056 A | 6/1983 | Stowe |
| 4,396,942 A | 8/1983 | Gates |
| 4,463,380 A | 7/1984 | Hooks |
| 4,489,322 A | 12/1984 | Zulch et al. |
| 4,490,742 A | 12/1984 | Wurtzinger |
| 4,491,399 A | 1/1985 | Bell |
| 4,495,500 A | 1/1985 | Vickers |
| 4,527,055 A | 7/1985 | Harkless et al. |
| 4,543,603 A | 9/1985 | Laures |
| 4,586,138 A | 4/1986 | Mullenhoff et al. |
| 4,635,136 A | 1/1987 | Ciampa et al. |
| 4,653,136 A | 3/1987 | Denison |
| 4,653,316 A | 3/1987 | Fukuhara |
| 4,673,988 A | 6/1987 | Jansson et al. |
| 4,686,474 A | 8/1987 | Olsen et al. |
| 4,688,092 A | 8/1987 | Kamel et al. |
| 4,689,748 A | 8/1987 | Hofmann |
| 4,707,698 A | 11/1987 | Constant et al. |
| 4,758,850 A | 7/1988 | Archdale et al. |
| 4,805,033 A | 2/1989 | Nishikawa |
| 4,807,024 A | 2/1989 | Mclaurin et al. |
| 4,814,711 A | 3/1989 | Olsen et al. |
| 4,814,896 A | 3/1989 | Heitzman et al. |
| 4,843,463 A | 6/1989 | Michetti |
| 4,899,296 A | 2/1990 | Khattak |
| 4,906,198 A | 3/1990 | Cosimano et al. |
| 4,953,227 A | 8/1990 | Katsuma et al. |
| 4,956,872 A | 9/1990 | Kimura |
| 5,034,812 A | 7/1991 | Rawlings |
| 5,086,314 A | 2/1992 | Aoki et al. |
| 5,121,222 A | 6/1992 | Endoh et al. |
| 5,138,444 A | 8/1992 | Hiramatsu |
| 5,155,597 A | 10/1992 | Lareau et al. |
| 5,164,825 A | 11/1992 | Kobayashi et al. |
| 5,166,789 A | 11/1992 | Myrick |
| 5,191,174 A | 3/1993 | Chang et al. |
| 5,200,793 A | 4/1993 | Ulich et al. |
| 5,210,586 A | 5/1993 | Grage et al. |
| 5,231,435 A | 7/1993 | Blakely |
| 5,247,356 A | 9/1993 | Ciampa |
| 5,251,037 A | 10/1993 | Busenberg |
| 5,265,173 A | 11/1993 | Griffin et al. |
| 5,267,042 A | 11/1993 | Tsuchiya et al. |
| 5,270,756 A | 12/1993 | Busenberg |
| 5,296,884 A | 3/1994 | Honda et al. |
| 5,335,072 A | 8/1994 | Tanaka et al. |
| 5,342,999 A | 8/1994 | Frei et al. |
| 5,345,086 A | 9/1994 | Bertram |
| 5,353,055 A | 10/1994 | Hiramatsu |
| 5,369,443 A | 11/1994 | Woodham |
| 5,381,338 A | 1/1995 | Wysocki |
| 5,402,170 A | 3/1995 | Parulski et al. |
| 5,414,462 A | 5/1995 | Veatch |
| 5,467,271 A | 11/1995 | Abel et al. |
| 5,481,479 A | 1/1996 | Wight et al. |
| 5,486,948 A | 1/1996 | Imai et al. |
| 5,506,644 A | 4/1996 | Suzuki et al. |
| 5,508,736 A | 4/1996 | Cooper |
| 5,555,018 A | 9/1996 | von Braun |
| 5,604,534 A | 2/1997 | Hedges et al. |
| 5,617,224 A | 4/1997 | Ichikawa et al. |
| 5,633,946 A | 5/1997 | Lachinski et al. |
| 5,668,593 A | 9/1997 | Lareau et al. |
| 5,677,515 A | 10/1997 | Selk et al. |
| 5,798,786 A | 8/1998 | Lareau et al. |
| 5,835,133 A | 11/1998 | Moreton et al. |
| 5,841,574 A | 11/1998 | Willey |
| 5,844,602 A | 12/1998 | Lareau et al. |
| 5,852,753 A | 12/1998 | Lo et al. |
| 5,894,323 A | 4/1999 | Kain et al. |
| 5,899,945 A | 5/1999 | Baylocq et al. |
| 5,963,664 A | 10/1999 | Kumar et al. |
| 6,037,945 A | 3/2000 | Loveland |
| 6,088,055 A | 7/2000 | Lareau et al. |
| 6,094,215 A | 7/2000 | Sundahl et al. |
| 6,097,854 A | 8/2000 | Szeliski et al. |
| 6,108,032 A | 8/2000 | Hoagland |
| 6,130,705 A | 10/2000 | Lareau et al. |
| 6,157,747 A | 12/2000 | Szeliski et al. |
| 6,167,300 A | 12/2000 | Cherepenin et al. |
| 6,222,583 B1 | 4/2001 | Matsumura et al. |
| 6,236,886 B1 | 5/2001 | Cherepenin et al. |
| 6,256,057 B1 | 7/2001 | Mathews et al. |
| 6,373,522 B2 | 4/2002 | Mathews et al. |
| 6,421,610 B1 | 7/2002 | Carroll et al. |
| 6,434,280 B1 | 8/2002 | Peleg et al. |
| 6,448,964 B1 | 9/2002 | Isaacs et al. |
| 6,597,818 B2 | 7/2003 | Kumar et al. |
| 6,639,596 B1 | 10/2003 | Shum et al. |
| 6,711,475 B2 | 3/2004 | Murphy |
| 6,731,329 B1 | 5/2004 | Feist et al. |
| 6,747,686 B1 | 6/2004 | Bennett |
| 6,810,383 B1 | 10/2004 | Loveland |
| 6,816,819 B1 | 11/2004 | Loveland |
| 6,826,539 B2 | 11/2004 | Loveland |
| 6,829,584 B2 | 12/2004 | Loveland |
| 6,834,128 B1 | 12/2004 | Altunbasak et al. |
| 6,876,763 B2 | 4/2005 | Sorek et al. |
| 7,009,638 B2 | 3/2006 | Gruber et al. |
| 7,018,050 B2 | 3/2006 | Ulichney et al. |
| 7,046,401 B2 | 5/2006 | Dufaux et al. |
| 7,061,650 B2 | 6/2006 | Walmsley et al. |
| 7,065,260 B2 | 6/2006 | Zhang et al. |
| 7,123,382 B2 | 10/2006 | Walmsley et al. |
| 7,127,348 B2 | 10/2006 | Smitherman et al. |
| 7,133,551 B2 | 11/2006 | Chen |
| 7,142,984 B2 | 11/2006 | Rahmes et al. |
| 7,184,072 B1 | 2/2007 | Loewen et al. |
| 7,233,691 B2 | 6/2007 | Setterholm |
| 7,262,790 B2 | 8/2007 | Bakewell |
| 7,348,895 B2 | 3/2008 | Lagassey |
| 7,509,241 B2 | 3/2009 | Guo |
| 7,728,833 B2 | 6/2010 | Verma |
| 7,832,267 B2 | 11/2010 | Woro |
| 7,844,499 B2 | 11/2010 | Yahiro |
| 8,031,947 B2 | 10/2011 | Jacobsen |
| 8,078,396 B2 | 12/2011 | Meadow |
| 8,103,445 B2 | 1/2012 | Smith et al. |
| 8,150,617 B2 | 4/2012 | Manber et al. |
| 8,422,825 B1 | 4/2013 | Neophytou et al. |
| 8,452,125 B2 | 5/2013 | Schultz et al. |
| 8,531,472 B2 | 9/2013 | Freund et al. |
| 8,705,843 B2 | 4/2014 | Lieckfeldt |
| 2002/0041328 A1 | 4/2002 | LeCompte et al. |
| 2002/0041717 A1 | 4/2002 | Murata et al. |
| 2002/0114536 A1 | 8/2002 | Xiong et al. |
| 2003/0014224 A1 | 1/2003 | Guo et al. |
| 2003/0043824 A1 | 3/2003 | Remboski et al. |
| 2003/0088362 A1 | 5/2003 | Melero et al. |
| 2003/0103682 A1 | 6/2003 | Blake et al. |
| 2003/0164962 A1 | 9/2003 | Nims et al. |
| 2003/0214585 A1 | 11/2003 | Bakewell |

(56) References Cited

U.S. PATENT DOCUMENTS

| | | |
|---|---|---|
| 2004/0105090 A1 | 6/2004 | Schultz et al. |
| 2004/0167709 A1 | 8/2004 | Smitherman et al. |
| 2005/0073241 A1 | 4/2005 | Yamauchi et al. |
| 2005/0088251 A1 | 4/2005 | Matsumoto |
| 2005/0169521 A1 | 8/2005 | Hel-Or |
| 2006/0028550 A1 | 2/2006 | Palmer et al. |
| 2006/0061566 A1 | 3/2006 | Verma et al. |
| 2006/0089792 A1 | 4/2006 | Manber et al. |
| 2006/0092043 A1 | 5/2006 | Lagassey |
| 2006/0238383 A1 | 10/2006 | Kimchi et al. |
| 2006/0250515 A1 | 11/2006 | Koseki et al. |
| 2007/0024612 A1 | 2/2007 | Balfour |
| 2007/0046448 A1 | 3/2007 | Smitherman |
| 2007/0237420 A1 | 10/2007 | Steedly et al. |
| 2008/0120031 A1 | 5/2008 | Rosenfeld et al. |
| 2008/0123994 A1 | 5/2008 | Schultz et al. |
| 2008/0158256 A1 | 7/2008 | Russell et al. |
| 2008/0247663 A1 | 10/2008 | Jacobsen |
| 2009/0177458 A1 | 7/2009 | Hochart et al. |
| 2009/0202101 A1 | 8/2009 | Nielsen et al. |
| 2009/0208095 A1 | 8/2009 | Zebedin |
| 2009/0249257 A1 | 10/2009 | Bove |
| 2009/0271719 A1 | 10/2009 | Clare et al. |
| 2009/0300553 A1 | 12/2009 | Pettigrew et al. |
| 2009/0304227 A1 | 12/2009 | Kennedy et al. |
| 2010/0085350 A1 | 4/2010 | Mishra |
| 2010/0205575 A1 | 8/2010 | Arora et al. |
| 2010/0205576 A1 | 8/2010 | Majumder et al. |
| 2010/0278424 A1 | 11/2010 | Warner |
| 2010/0296693 A1 | 11/2010 | Thornberry et al. |
| 2011/0033110 A1 | 2/2011 | Shimamura et al. |
| 2011/0109719 A1 | 5/2011 | Wilson et al. |
| 2011/0196610 A1 | 8/2011 | Waldman et al. |
| 2013/0212537 A1 | 8/2013 | Hall |
| 2013/0246204 A1 | 9/2013 | Thornberry et al. |
| 2014/0125671 A1* | 5/2014 | Vorobyov ............. G01C 11/00 345/427 |

FOREIGN PATENT DOCUMENTS

| | | |
|---|---|---|
| CA | 2402234 | 9/2000 |
| CA | 2505566 | 5/2004 |
| CN | 1735897 A | 2/2006 |
| DE | 60017384 T | 3/2006 |
| DE | 60306301 T | 11/2006 |
| DK | 1418402 T | 10/2006 |
| EP | 1010966 | 2/1999 |
| EP | 1180967 | 2/2002 |
| EP | 1418402 | 5/2004 |
| EP | 1696204 | 8/2006 |
| ES | 2266704 T | 3/2007 |
| JP | 11328378 | 11/1999 |
| JP | 2003/317089 A | 11/2003 |
| JP | 2007149046 A | 6/2007 |
| MX | PA05004987 | 2/2006 |
| WO | WO99/18732 | 4/1999 |
| WO | WO/2000/053090 | 9/2000 |
| WO | WO/2004/044692 | 5/2004 |
| WO | WO/2005/088251 | 9/2005 |
| WO | WO/2008/028040 | 3/2008 |

OTHER PUBLICATIONS

Mexican Patent Office, Official Action regarding Mexican Patent Application No. MX/a/2014/014451 and English summary, Jul. 2015.
International Search Authority Korean Intellectual Property Office, International Search Report and Written Opinion regarding PCT/US11/065418, dated May 30, 2012.
International Bureau, Preliminary Report on Patentability regarding PCT/US11/065418, dated Jun. 27, 2013.
Xactware Solutions, Inc., Petition for inter partes review of U.S. Pat. No. 8,823,732, IPR2016-00593, dated Feb. 8, 2016.
Able Software Corp., R2V for Windows User's Manual (as filed as Exhibit-1003 in IPR2016-00593), Sep. 16, 2000.
Pictometry International Corp., Electronic Field Study User Guide Version 2.7 (as filed as Exhibit-1004 in IPR2016-00593), Jul. 2007.
Gleicher, Michael, Image Snapping (as filed as Exhibit-1005 in IPR2016-00593), 1995.
Schuch, Harold, Declaration in support of Petition for inter partes review of U.S. Pat. No. 8,823,732, IPR2016-00593 (as filed as Exhibit-1006 in IPR2016-00593), dated Feb. 8, 2016.
Eagle View Technologies, Inc., and Pictometry International Corp; Complaint for infringement of U.S. Pat. No. 8,823,732 in litigation (*Eagle View Technologies, Inc., and Pictometry International Corp. v. Xactware Solutions, Inc., and Verisk Analytics, Inc.*) in the United States District Court District of New Jersey, case No. njd-1-15-cv-07025-RBK-JS, filing date Sep. 23, 2015.
Xactware Solutions, Inc., and Verisk Analytics, Inc., Answer to Complaint for infringement of U.S. Pat. No. 8,823,732 in litigation (*Eagle View Technologies, Inc., and Pictometry International Corp. v. Xactware Solutions, Inc., and Verisk Analytics, Inc.*) in the United States District Court District of New Jersey, case No. njd-1-15-cv-07025-RBK-JS, filing date Nov. 12, 2015.
Eagle View Technologies, Inc., and Pictometry International Corp; Amended Complaint for infringement of U.S. Pat. No. 8,823,732 in litigation (*Eagle View Technologies, Inc., and Pictometry International Corp. v. Xactware Solutions, Inc., and Verisk Analytics, Inc.*) in the United States District Court District of New Jersey, case No. njd-1-15-cv-07025-RBK-JS, filing date Nov. 30, 2015.
Xactware Solutions, Inc., and Verisk Analytics, Inc., Amended Answer, Affirmative Defenses, Counterclaims to Amended Complaint for infringement of U.S. Pat. No. 8,823,732 in litigation (*Eagle View Technologies, Inc., and Pictometry International Corp. v. Xactware Solutions, Inc., and Verisk Analytics, Inc.*) in the United States District Court District of New Jersey, case No. njd-1-15-cv-07025-RBK-JS, filed Dec. 14, 2015.
Xactware Solutions, Inc., and Verisk Analytics, Inc., Motion to Dismiss Complaint for infringement of U.S. Pat. No. 8,823,732 under 35 U.S.C. 101 and supporting Memorandum in litigation (*Eagle View Technologies, Inc., and Pictometry International Corp. v. Xactware Solutions, Inc., and Verisk Analytics, Inc.*) in the United States District Court District of New Jersey, case No. njd-1-15-cv-07025-RBK-JS, filing date Feb. 9, 2016.
Xactware Solutions, Inc., and Verisk Analytics, Inc., Invalidity Contentions regarding U.S. Pat. No. 8,823,732 in litigation (*Eagle View Technologies, Inc., and Pictometry International Corp. v. Xactware Solutions, Inc., and Verisk Analytics, Inc.*) in the United States District Court District of New Jersey, case No. njd-1-15-cv-07025-RBK-JS, filing date Feb. 9, 2016.
Mexican Patent Office, Official Action regarding Mexican Patent Application No. MX/a/2014/014451 and English translation, Nov. 2015.
Bertan et al., Automatic 3D Roof Reconstruction Using Digital Cadastral Map, Architectural Knowledge and an Aerial Image; 2006 IEEE International Geoscience and Remote Sensing Symposium, IGARSS, 2006.
Eagle View Technologies, Inc., and Pictometry International Corp., Response with Claim Charts to Invalidity Contentions regarding U.S. Pat. No. 8,823,732 in litigation (*Eagle View Technologies, Inc., and Pictometry International Corp. v. Xactware Solutions, Inc., and Verisk Analytics, Inc.*) in the United States District Court District of New Jersey, case No. njd-1-15-cv-07025-RBK-JS, filing date Mar. 10, 2016.
Eagle View Technologies, Inc., and Pictometry International Corp., Response in Opposition to Motion to Dismiss Complaint for Infringement of U.S. Pat. No. 8,823,732 under 35 U.S.C. 101 (*Eagle View Technologies, Inc., and Pictometry International Corp. v. Xactware Solutions, Inc., and Verisk Analytics, Inc.*) in the United States District Court District of New Jersey, case No. njd-1-15-cv-07025-RBK-JS, filed Mar. 22, 2016.
Ackermann, Prospects of Kinematic GPS Aerial Triangulation, ITC Journal, 1992.
Ciampa, John A., "Pictometry Digital Video Mapping", SPIE, vol. 2598, pp. 140-148, 1995.

(56) References Cited

OTHER PUBLICATIONS

Ciampa, J. A., Oversee, Presented at Reconstruction After Urban earthquakes, Buffalo, NY, 1989.
Dunford et al., Remote Sensing for Rural Development Planning in Africa, The Journal for the International Institute for Aerial Survey and Earth Sciences, 2:99-108, 1983.
Gagnon, P.A., Agnard, J. P., Nolette, C., & Boulianne, M., "A Micro-Computer based General Photogrammetric System", Photogrammetric Engineering and Remote Sensing, vol. 56, No. 5., pp. 623-625, 1990.
Konecny, G., "Issues of Digital Mapping", Leibniz University Hannover, Germany, GIS Ostrava 2008, Ostrava 27.—Jan. 30, 2008, pp. 1-8.
Konecny, G., "Analytical Aerial Triangulation with Convergent Photography", Department of Surveying Engineering, University of New Brunswick, pp. 37-57, 1966.
Konecny, G., "Interior Orientation and Convergent Photography", Photogrammetric Engineering, pp. 625-634, 1965.
Graham, Lee A., "Airborne Video for Near-Real-Time Vegetation Mapping", Journal of Forestry, 8:28-32, 1993.
Graham, Horita TRG-50 SMPTE Time-Code Reader, Generator, Window Inserter, 1990.
Hess, L.L, et al., "Geocoded Digital Videography for Validation of Land Cover Mapping in the Amazon Basin", International Journal of Remote Sensing, vol. 23, No. 7, pp. 1527-1555, 2002.
Hinthorne, J., et al., "Image Processing in The Grass GIS", Geoscience and Remote Sensing Symposium, 4:2227-2229, 1991.
Imhof, Ralph K., "Mapping from Oblique Photographs", Manual of Photogrammetry, Chapter 18, 1966.
Jensen, John R., Introductory Digital Image Processing: A Remote Sensing Perspective, Prentice-Hall, 1986; 399 pages.
Lapine, Lewis A., "Practical Photogrammetric Control by Kinematic GPS", GPS World, 1(3):44-49, 1990.
Lapine, Lewis A., Airborne Kinematic GPS Positioning for Photogrammetry—The Determination of the Camera Exposure Station, Silver Spring, MD, 11 pages, at least as early as 2000.
Linden et al., Airborne Video Automated Processing, US Forest Service Internal report, Fort Collins, CO, 1993.
Myhre, Dick, "Airborne Video System Users Guide", USDA Forest Service, Forest Pest Management Applications Group, published by Management Assistance Corporation of America, 6 pages, 1992.
Myhre et al., "An Airborne Video System Developed Within Forest Pest Management—Status and Activities", 10 pages, 1992.
Myhre et al., "Airborne Videography—A Potential Tool for Resource Managers"—Proceedings: Resource Technology 90, 2nd International Symposium on Advanced Technology in Natural Resource Management, 5 pages, 1990.
Myhre et al., Aerial Photography for Forest Pest Management, Proceedings of Second Forest Service Remote Sensing Applications Conference, Slidell, Louisiana, 153-162, 1988.
Myhre et al., "Airborne Video Technology", Forest Pest Management/Methods Application Group, Fort Collins, CO, pp. 1-6, at least as early as Jul. 30, 2006.
Norton-Griffiths et al., 1982. "Sample surveys from light aircraft combining visual observations and very large scale color photography". University of Arizona Remote Sensing Newsletter 82-2:1-4.
Norton-Griffiths et al., "Aerial Point Sampling for Land Use Surveys", Journal of Biogeography, 15:149-156, 1988.
Novak, Rectification of Digital Imagery, Photogrammetric Engineering and Remote Sensing, 339-344, 1992.
Slaymaker, Dana M., "Point Sampling Surveys with GPS-logged Aerial Videography", Gap Bulletin No. 5, University of Idaho, http://www.gap.uidaho.edu/Bulletins/5/PSSwGPS.html, 1996.
Slaymaker, et al., "Madagascar Protected Areas Mapped with GPS-logged Aerial Video and 35mm Air Photos", Earth Observation magazine, vol. 9, No. 1, http://www.eomonline.com/Common/Archives/2000jan/00jan_tableofcontents.html, pp. 1-4, 2000.

Slaymaker, et al., "Cost-effective Determination of Biomass from Aerial Images", Lecture Notes In Computer Science, 1737:67-76, http://portal.acm.org/citation.cfm?id=648004.743267&coll+GUIDE&dl+, 1999.
Slaymaker, et al., "A System for Real-time Generation of Georeferenced Terrain Models", 4232A-08, SPIE Enabling Technologies for Law Enforcement Boston, MA, ftp://vis-ftp.cs.umass.edu/Papers/schultz/spie2000.pdf, 2000.
Slaymaker, et al., "Integrating Small Format Aerial Photography, Videography, and a Laser Profiler for Environmental Monitoring", In ISPRS WG III/1 Workshop on Integrated Sensor Calibration and Orientation, Portland, Maine, 1999.
Slaymaker, et al., "Calculating Forest Biomass With Small Format Aerial Photography, Videography And A Profiling Laser", In Proceedings of the 17th Biennial Workshop on Color Photography and Videography in Resource Assessment, Reno, NV, 1999.
Slaymaker et al., Mapping Deciduous Forests in Southern New England using Aerial Videography and Hyperclustered Multi-Temporal Landsat TM Imagery, Department of Forestry and Wildlife Management, University of Massachusetts, 1996.
Star et al., "Geographic Information Systems an Introduction", Prentice-Hall, 1990.
Tomasi et al., "Shape and Motion from Image Streams: a Factorization Method"—Full Report on the Orthographic Case, pp. 9795-9802, 1992.
Warren, Fire Mapping with the Fire Mousetrap, Aviation and Fire Management, Advanced Electronics System Development Group, USDA Forest Service, 1986.
Welch, R., "Desktop Mapping with Personal Computers", Photogrammetric Engineering and Remote Sensing, 1651-1662, 1989.
Westervelt, James, "Introduction to GRASS 4", pp. 1-25, 1991.
"RGB Spectrum Videographics Report, vol. 4, No. 1, McDonnell Douglas Integrates RGB Spectrum Systems in Helicopter Simulators", pp. 1-6, 1995.
RGB "Computer Wall", RGB Spectrum, 4 pages, 1995.
"The First Scan Converter with Digital Video Output", Introducing . . . The RGB/Videolink 1700D-1, RGB Spectrum, 2 pages, 1995.
ERDAS Field Guide, Version 7.4, A Manual for a commercial image processing system, 1990.
"Image Measurement and Aerial Photography", Magazine for all branches of Photogrammetry and its fringe areas, Organ of the German Photogrammetry Association, Berlin-Wilmersdorf, No. 1, 1958.
"Airvideo Analysis", Microimages, Inc., Lincoln, NE, 1 page, Dec. 1992.
Zhu, Zhigang, Hanson, Allen R., "Mosaic-Based 3D Scene Representation and Rendering", Image Processing, 2005, ICIP 2005, IEEE International Conference on 1(2005).
Mostafa, et al., "Direct Positioning and Orientation Systems How do they Work? What is the Attainable Accuracy?", Proceeding, American Society of Photogrammetry and Remote Sensing Annual Meeting, St. Louis, MO, Apr. 24-27, 2001.
"POS AV" georeferenced by APPLANIX aided inertial technology, http://www.applanix.com/products/posav_index.php.
Mostafa, et al., "Ground Accuracy from Directly Georeferenced Imagery", Published in GIM International vol. 14 N. Dec. 12, 2000.
Mostafa, et al., "Airborne Direct Georeferencing of Frame Imagery: An Error Budget", The $3^{rd}$ International Symposium on Mobile Mapping Technology, Cairo, Egypt, Jan. 3-5, 2001.
Mostafa, M.R. and Hutton, J., "Airborne Kinematic Positioning and Attitude Determination Without Base Stations", Proceedings, International Symposium on Kinematic Systems in Geodesy, Geomatics, and Navigation (KIS 2001) Banff, Alberta, Canada, Jun. 4-8, 2001.
Mostafa, et al., "Airborne DGPS Without Dedicated Base Stations for Mapping Applications", Proceedings of ION-GPS 2001, Salt Lake City, Utah, USA, Sep. 11-14.
Mostafa, "ISAT Direct Exterior Orientation QA/QC Strategy Using POS Data", Proceedings of OEEPE Workshop: Integrated Sensor Orientation, Hanover, Germany, Sep. 17-18, 2001.
Mostafa, "Camera/IMU Boresight Calibration: New Advances and Performance Analysis", Proceedings of the ASPRS Annual Meeting, Washington, D.C., Apr. 21-26, 2002.

(56) References Cited

OTHER PUBLICATIONS

Hiatt, "Sensor Integration Aids Mapping at Ground Zero", Photogrammetric Engineering and Remote Sensing, Sep. 2002, p. 877-878.
Mostafa, "Precision Aircraft GPS Positioning Using CORS", Photogrammetric Engineering and Remote Sensing, Nov. 2002, p. 1125-1126.
Mostafa, et al., System Performance Analysis of INS/DGPS Integrated System for Mobile Mapping System (MMS), Department of Geomatics Engineering, University of Calgary, Commission VI, WG VI/4, Mar. 2004.
Artes F., & Hutton, J., "GPS and Inertial Navigation Delivering", Sep. 2005, GEOconnexion International Magazine, p. 52-53, Sep. 2005.
"POS AV" APPLANIX, Product Outline, airborne@applanix.com, 3 pages, Mar. 28, 2007.
POSTrack, "Factsheet", APPLANIX, Ontario, Canada, www.applanix.com, Mar. 2007.
POS AV "Digital Frame Camera Applications", 3001 Inc., Brochure, 2007.
POS AV "Digital Scanner Applications", Earthdata Brochure, Mar. 2007.
POS AV "Film Camera Applications" AeroMap Brochure, Mar. 2007.
POS AV "LIDAR Applications" MD Atlantic Brochure, Mar. 2007.
POS AV "OEM System Specifications", 2005.
POS AV "Synthetic Aperture Radar Applications", Overview, Orbisat Brochure, Mar. 2007.
"POSTrack V5 Specifications" 2005.
"Remote Sensing for Resource Inventory Planning and Monitoring", Proceeding of the Second Forest Service Remote Sensing Applications Conference—Slidell, Louisiana and NSTL, Mississippi, Apr. 11-15, 1988.
"Protecting Natural Resources with Remote Sensing", Proceeding of the Third Forest Service Remote Sensing Applications Conference—Apr. 9-13, 1990.
Heipke, et al, "Test Goals and Test Set Up for the OEEPE Test—Integrated Sensor Orientation", 1999.
Kumar, et al., "Registration of Video to Georeferenced Imagery", Sarnoff Corporation, CN5300, Princeton, NJ, 1998.
McConnel, Proceedings Aerial Pest Detection and Monitoring Workshop—1994.pdf, USDA Forest Service Forest Pest Management, Northern Region, Intermountain region, Forest Insects and Diseases, Pacific Northwest Region.
"Standards for Digital Orthophotos", National Mapping Program Technical Instructions, US Department of the Interior, Dec. 1996.
Tao, "Mobile Mapping Technology for Road Network Data Acquisition", Journal of Geospatial Engineering, vol. 2, No. 2, pp. 1-13, 2000.
"Mobile Mapping Systems Lesson 4", Lesson 4 SURE 382 Geographic Information Systems II, pp. 1-29, Jul. 2, 2006.
Konecny, G., "Mechanische Radialtriangulation mit Konvergentaufnahmen", Bildmessung and Luftbildwesen, 1958, Nr. 1.
Myhre, "ASPRS/ACSM/RT 92" Technical papers, Washington, D.C., vol. 5 Resource Technology 92, Aug. 3-8, 1992.
Rattigan, "Towns get new view from above," *The Boston Globe*, Sep. 5, 2002.
Mostafa, et al., "Digital image georeferencing from a multiple camera system by GPS/INS," *ISP RS Journal of Photogrammetry & Remote Sensing*, 56(I): I-12, Jun. 2001.
Dillow, "Grin, or bare it, for aerial shot," *Orange County Register* (California), Feb. 25, 2001.
Anonymous, "Live automatic coordinates for aerial images," *Advanced Imaging*, 12(6):51, Jun. 1997.
Anonymous, "Pictometry and US Geological Survey announce—Cooperative Research and Development Agreement," Press Release published Oct. 20, 1999.
Miller, "Digital software gives small Arlington the Big Picture," *Government Computer NewsState & Local*, 7(12), Dec. 2001.
Garrett, "Pictometry: Aerial photography on steroids," *Law Enforcement Technology* 29(7):114-116, Jul. 2002.

Weaver, "County gets an eyeful," *The Post-Standard* (Syracuse, NY), May 18, 2002.
Reed, "Firm gets latitude to map O.C. in 3D," *Orange County Register* (California), Sep. 27, 2000.
Reyes, "Orange County freezes ambitious aerial photography project," *Los Angeles Times*, Oct. 16, 2000.
Aerowest Pricelist of Geodata as of Oct. 21, 2005 and translations to English 3 pages.
www.archive.org Web site showing archive of German AeroDach Web Site http://www.aerodach.de from Jun. 13, 2004 (retrieved Sep. 20, 2012) and translations to English 4 pages.
AeroDach® Online Roof Evaluation Standard Delivery Format and 3D Data File: Document Version 01.00.2002 with publication in 2002, 13 pages.
Noronha et al., "Detection and Modeling of Building from Multiple Aerial Images," Institute for Robotics and Intelligent Systems, University of Southern California, Nov. 27, 2001, 32 pages.
Applicad Reports dated Nov. 25, 1999-Mar. 9, 2005, 50 pages.
Applicad Online Product Bulletin archive from Jan. 7, 2003, 4 pages.
Applicad Sorcerer Guide, Version 3, Sep. 8, 1999, 142 pages.
Xactimate Claims Estimating Software archive from Feb. 12, 2010, 8 pages.
Bignone et al, Automatic Extraction of Generic House Roofs from High Resolution Aerial Imagery, Communication Technology Laboratory, Swiss Federal Institute of Technology ETH, CH-8092 Zurich, Switzerland, 12 pages, 1996.
Geospan 2007 Job proposal.
Greening et al., Commercial Applications of GPS-Assisted Photogrammetry, Presented at GIS/LIS Annual Conference and Exposition, Phoenix, AZ, Oct. 1994.
Pictometry International Corp., Patent Owner's Preliminary Response to petition for inter partes review of U.S. Pat. No. 8,823,732, IPR2016-00593, Filed Jun. 2, 2016.
USPTO Patent Trial and Appeal Board; Institution Decision for inter partes review of claims 12-15, 21-23, 25-27, 33-38, 44, and 45 of U.S. Pat. No. 8,823,732, IPR2016-00593, Paper 13, Aug. 31, 2016.
Unknown; Cohasset Town Report for the year ending Dec. 31, 2008; 2009; (provided to Pictometry International Corp. as supplemental evidence regarding Pictometry Electronic Field Study Guide Version 2.7 during the inter partes review of claims of U.S. Pat. No. 8,823,732, IPR2016-00593).
Pictometry International Corp., EFS 2.7 Getting Started Guide, Jul. 2007 (provided to Pictometry International Corp. as supplemental evidence regarding Pictometry Electronic Field Study Guide Version 2.7 during the inter partes review of claims of U.S. Pat. No. 8,823,732, IPR2016-00593).
Asimonye, Bernard; Geospatial Information Systems Council—Pictometry: Oblique Imagery Training—Announcement; Apr. 6, 2009; (provided to Pictometry International Corp. as supplemental evidence regarding Pictometry Electronic Field Study Guide Version 2.7 during the inter partes review of claims of U.S. Pat. No. 8,823,732, IPR2016-00593).
Unknown; Genesee County GIS Working Group Meeting Minutes; 2007; (provided to Pictometry International Corp. as supplemental evidence regarding Pictometry Electronic Field Study Guide Version 2.7 during the inter partes review of claims of U.S. Pat. No. 8,823,732, IPR2016-00593).
Unknown; Los Angeles Region Imagery Acquisition Consortium (LAR-IAC2) Product Guide 2; Feb. 2009; (provided to Pictometry International Corp. as supplemental evidence regarding Pictometry Electronic Field Study Guide Version 2.7 during the inter partes review of claims of U.S. Pat. No. 8,823,732, IPR2016-00593).
Unknown; LARIAC1 Pictometry Training Announcement; Feb. 2009; (provided to Pictometry International Corp. as supplemental evidence regarding Pictometry Electronic Field Study Guide Version 2.7 during the inter partes review of claims of U.S. Pat. No. 8,823,732, IPR2016-00593).
Unknown; Los Angeles County Extends its License Agreement with Pictometry for New Oblique Aerial Photos; Directions Magazine—Press Releases; Mar. 2006; (provided to Pictometry International Corp. as supplemental evidence regarding Pictometry Electronic

(56) References Cited

OTHER PUBLICATIONS

Field Study Guide Version 2.7 during the inter partes review of claims of U.S. Pat. No. 8,823,732, IPR2016-00593).
Unknown; Screen shot of properties page for "TXWILMAdministrative Training" PowerPoint File; Sep. 2008; (provided to Pictometry International Corp. as supplemental evidence regarding Pictometry Electronic Field Study Guide Version 2.7 during the inter partes review of claims of U.S. Pat. No. 8,823,732, IPR2016-00593).
Unknown; Pictometry Training Descriptions, Unknown date; (provided to Pictometry International Corp. as supplemental evidence regarding Pictometry Electronic Field Study Guide Version 2.7 during the inter partes review of claims of U.S. Pat. No. 8,823,732, IPR2016-00593).
Horan, Mike; Pictometry Administrative Training PowerPoint; Unknown date; (provided to Pictometry International Corp. as supplemental evidence regarding Pictometry Electronic Field Study Guide Version 2.7 during the inter partes review of claims of U.S. Pat. No. 8,823,732, IPR2016-00593).
Unknown; Pictometry Announces Technical Advancements for GIS Professionals; GISuser; Dec. 2006 (provided to Pictometry International Corp. as supplemental evidence regarding Pictometry Electronic Field Study Guide Version 2.7 during the inter partes review of claims of U.S. Pat. No. 8,823,732, IPR2016-00593).
Unknown; Pictometry Announces Technical Advancements for GIS Professionals; Directions Magazine—Press Releases; Dec. 2006; (provided to Pictometry International Corp. as supplemental evidence regarding Pictometry Electronic Field Study Guide Version 2.7 during the inter partes review of claims of U.S. Pat. No. 8,823,732, IPR2016-00593).
Los Angeles County Department of Regional Planning; PowerPoint slides titled "Pictometry"; Apr. 19, 2007; (provided to Pictometry International Corp. as supplemental evidence regarding Pictometry Electronic Field Study Guide Version 2.7 during the inter partes review of claims of U.S. Pat. No. 8,823,732, IPR2016-00593).
Office of Transportation Planning; Pictometry License Guidelines; Jan. 26, 2005; (provided to Pictometry International Corp. as supplemental evidence regarding Pictometry Electronic Field Study Guide Version 2.7 during the inter partes review of claims of U.S. Pat. No. 8,823,732, IPR2016-00593).
Lanctot, Corey; Welcome to Your End User Training; Unknown date; (provided to Pictometry International Corp. as supplemental evidence regarding Pictometry Electronic Field Study Guide Version 2.7 during the inter partes review of claims of U.S. Pat. No. 8,823,732, IPR2016-00593).
Association for Computing Machinery; Screenshots from ACM Digital Library regarding reference "Image Snapping" by Michael Gleicher; Sep. 2016; (provided to Pictometry International Corp. as supplemental evidence "Image Snapping" by Michael Gleicher during the inter partes review of claims of U.S. Pat. No. 8,823,732, IPR2016-00593).
Pictometry International Corp., Patent Owner's Response in inter partes review of U.S. Pat. No. 8,823,732, IPR2016-00593, Filed Nov. 16, 2016.
Bajaj, Declaration of Dr. Chandrajit Bajaj, as filed as Exhibit-2006 in inter partes review of U.S. Pat. No. 8,823,732, IPR2016-00593, on Nov. 16, 2016.
Deposition of Mr. Harold Schuch of Nov. 2, 2016, as filed as Exhibit-2005 in inter partes review of U.S. Pat. No. 8,823,732, IPR2016-00593, on Nov. 16, 2016.
Pictometry International Corp. et al.; Metropolitan Area Planning Council License Agreement; 2009; as filed as Exhibit-2009 in inter partes review of U.S. Pat. No. 8,823,732, IPR2016-00593, on Nov. 16, 2016.
Xactware Solutions, Inc., Petitioner's Reply to Patent Owner's Response in inter partes review of U.S. Pat. No. 8,823,732, IPR2016-00593, Filed Jan. 27, 2017.
Canadian Patent Office, Office Action regarding Canadian Patent Application No. 2,819,166, dated Oct. 17, 2017.
Mexican Patent Office, Office Action regarding Mexican Patent Application No. MX/a/2016/003154 , dated Oct. 22, 2017.
Xactware Solutions, Inc., Appellant Brief filed in *Xactware Solutions, Inc.* v. *Pictometry International Corp.*, Fed. Cir. Case 18-1094 (consolidated with Case 18-1093) (Appeal of USPTO PTAB Final Written Decision in inter partes review of claims 12-15, 21-23, 25-27, 33-38, 44, and 45 of U.S. Pat. No. 8,823,732, IPR2016-00593), Mar. 5, 2018.
Pictometry International Corp., Response to Canadian Patent Office's Office Action regarding Canadian Patent Application No. 2,819,166, dated Oct. 17, 2017.
Canadian Patent Office, Office Action regarding Canadian Patent Application No. 2,819,166, dated Sep. 26, 2018.
Pictometry International Corp., Appellee Brief (corrected) filed in *Xactware Solutions, Inc.* v. *Pictometry International Corp.*, Fed. Cir. Case 18-1094 (consolidated with Case 18-1093) (Appeal of USPTO PTAB Final Written Decision in inter partes review of claims 12-15, 21-23, 25-27, 33-38, 44, and 45 of U.S. Pat. No. 8,823,732, IPR2016-00593), Apr. 18, 2018.
Xactware Solutions, Inc., Reply Brief filed in *Xactware Solutions, Inc.* v. *Pictometry International Corp.*, Fed. Cir. Case 18-1094 (consolidated with Case 18-1093) (Appeal of USPTO PTAB Final Written Decision in inter partes review of claims 12-15, 21-23, 25-27, 33-38, 44, and 45 of U.S. Pat. No. 8,823,732, IPR2016-00593), May 30, 2018.
European Patent Office, Search Report and Written Opinion regarding European Patent Application No. 11849260.2, dated Aug. 18, 2017.
Pictometry International Corp, Response to Aug. 18, 2017 Search Report and Written Opinion regarding European Patent Application No. 11849260.2, dated Mar. 8, 2018.
European Patent Office, Examination Report regarding European Patent Application No. 11849260.2, dated Jun. 21, 2018.
Carpendale et al., "Achieving Higher Magnification in Context", UIST 04. Proceedings of the 17th Annual ACM Symposium on User Interface Software and Technology, Santa Fe, NM, Oct. 24-27, 2004, New York, NY: ACM Press, US, ISBN 978-1-58113-957-0, Oct. 24, 2004.
Canadian Patent Office, Office Action regarding Canadian Patent Application No. 2,819,166, dated Aug. 19, 2019.
Pictometry International Corp., Response to Jun. 21, 2018 Examination Report regarding European Patent Application No. 11849260. 2, dated Dec. 20, 2018.
Pictometry International Corp., Response to Canadian Patent Office's Office Action regarding Canadian Patent Application No. 2,819,166, dated Mar. 26, 2019.

* cited by examiner

SYSTEMS AND METHODS FOR PROCESSING IMAGES WITH EDGE DETECTION AND SNAP-TO FEATURE

INCORPORATION BY REFERENCE

The present patent application is a continuation of U.S. Ser. No. 12/972,088, filed Dec. 17, 2010, the entire contents of all of which are hereby incorporated herein by reference in their entirety.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

BACKGROUND OF THE INVENTION

1. Field of Invention

The inventive concepts disclosed and claimed herein relate generally to digital image processing and, more particularly, but not by way of limitation, to finding and selecting points of interest on an edge of interest in a digital image.

2. Brief Description of Related Art

In the remote sensing/aerial imaging industry, imagery is used to capture views of a geographic area to be able to measure objects and structures within the images as well as to be able to determine geographic locations of points within the image. Such imagery is described in, for example, U.S. Patent Application Publication No. 2008/0231700. Photogrammetry is the science of making measurements of and between objects depicted within photographs, especially aerial photographs. A person, or User, may interact with the image to select Points of Interest that may be used to perform other functions such as: determine distance between two points; determine the area outlined by a set of points; determine the volume of a 3-dimensional shape, or other functions. Usually, the greatest error induced into the calculation of the function is the human error introduced by the User selecting the Points of Interest. For example, if a measurement from a building to the edge of a curb is desired and the User selects a point that is close to the edge of the building, but not the actual edge of the building, then the measurement will differ from the actual measurement by the distance the User selected away from the building. In the projected image, several pixels could significantly impair the accuracy of the measurement. Additionally, when multiple Users perform the same measurement, their results can differ significantly.

In light of the foregoing, there is a need for a system and process for allowing a User to select Points of Interest based on the edge elements that exist in a geo-referenced image, wherein the Points of Interest are determined without the error caused by human determination of the position of the edge of an element in an image.

SUMMARY OF THE INVENTION

A method for creating image products includes the following steps. Image data and positional data corresponding to the image data are captured and processed to create geo-referenced images. Edge detection procedures are performed on the geo-referenced images to identify edges and produce geo-referenced, edge-detected images.

In one embodiment, a computerized system includes a computer system for storing a database of captured oblique images with corresponding geo-location data and corresponding detected edge data. The computer system has computer executable logic that, when executed by a processor, causes the computer system to receive a selection of a geographic point from a User, search the database to find images that contain the selected point, and make the images that contain the selected point available to the User.

In another embodiment a method of providing images to a User includes the following steps. A database stores captured oblique images having corresponding geo-location data and corresponding detected edge data. A selection of a geographic point is received from a user and the database is then searched to find images that contain the selected geographic point. The images that contain the selected geographic point are then made available to the User.

In yet another embodiment a sequence of instructions is stored on at least one non-transitory computer readable medium for running on a computer system capable of displaying and navigating imagery. The sequence of instructions includes instructions for causing the computer system to display a pixel representation of a georeferenced, edge-detected image, wherein the pixel representation includes one or more detected edges in the geo-referenced, edge-detected image; instructions for causing the computer system to allow the User to select one of the one or more detected edges by moving a cursor over a region of interest (which may be magnified), wherein the cursor is caused to snap-to a selected detected edge when the cursor is within a predetermined distance from the selected detected edge; instructions for causing the computer system to allow the User to accept the selected detected edge as an edge of interest; and instructions for causing the computer system to allow the User to determine and store one or more points of interest along the edge of interest.

In yet another embodiment, a system for preparing and utilizing geo-referenced images includes one or more image and data files accessible by a computer system capable of displaying and navigating digital imagery, the image and data file including a plurality of image files, detected edge information corresponding to the plurality of image files, and positional data corresponding to the plurality of image files; and image display and analysis software stored on a non-transitory computer readable medium and executable by the computer system. The image display and analysis software causes the computer system to allow a user to download and display, from the image and data file, a pixel representation of an image having a plurality of detected edges within the image, and to select a detected edge within the pixel representation by moving a cursor over the pixel representation, wherein the cursor is caused to snap-to a selected detected edge when the cursor is within a predetermined distance from the selected detected edge. The image display and analysis software also causes the computer system to allow the user to accept the selected detected edge as an edge of interest; and to allow the user to determine and store one or more points of interest along the edge of interest.

Thus, utilizing (1) the technology known in the art; (2) the above-referenced general description of the presently claimed and disclosed inventive concept(s); and (3) the drawings and detailed description of the inventive concepts that follows, the advantages and novelties of the presently claimed and disclosed inventive concept(s) are readily apparent to one of ordinary skill in the art.

BRIEF DESCRIPTION OF THE DRAWINGS

Like reference numerals in the figures represent and refer to the same element or function. Implementations of the disclosure may be better understood when consideration is given to the following detailed description thereof. Such description makes reference to the annexed pictorial illustrations, schematics, graphs, drawings, and appendices. In the drawings.

DETAILED DESCRIPTION OF THE INVENTION

Figure 1:
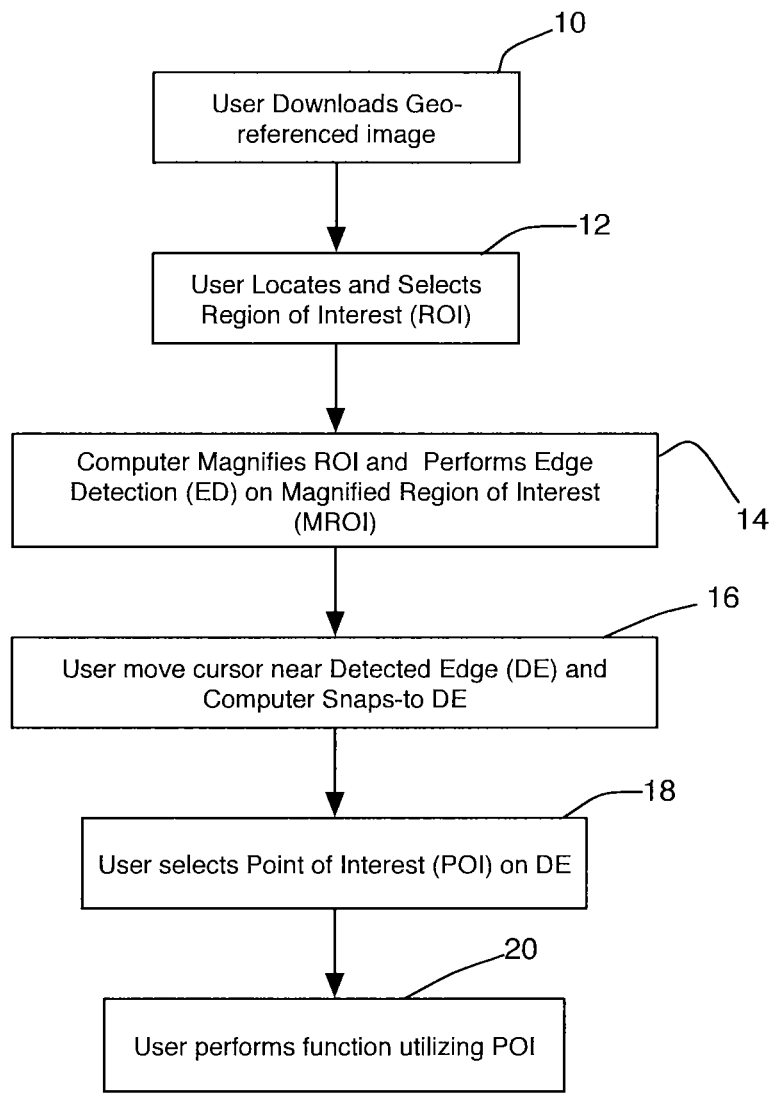
FIG. 1 is a flow chart showing an exemplary process for selecting a Point of Interest on an edge element in a digital photographic image.

Before explaining at least one embodiment of the inventive concepts(s) disclosed herein in detail, it is to be understood that the inventive concept(s) is not limited in its application to the details of construction and the arrangement of the components or steps or methodologies set forth in the following description or illustrated in the drawings. The inventive concept(s) disclosed herein is capable of other embodiments or of being practiced or carried out in various ways. Also, it is to be understood that the phraseology and terminology employed herein is for the purpose of description and should not be regarded as limiting.

In the following detailed description of embodiments of the disclosure, numerous specific details are set forth in order to provide a more thorough understanding of the disclosure. However, it will be apparent to one of ordinary skill in the art that the concepts within the disclosure can be practiced without these specific details. In other instances, well-known features have not been described in detail to avoid unnecessarily complicating the description.

The inventive concept(s) disclosed herein is directed to methods and systems of creating image products, wherein image data is captured, along with positional data corresponding to the image data. The image and positional data are processed to create a plurality of geo-referenced images. In one embodiment disclosed herein, edge detection procedures are performed on the plurality of geo-referenced images to identify edges and produce geo-referenced, edge-detected images, which are saved in a database. A computer system storing such a database of captured oblique images having corresponding geo-location data and corresponding detected edge data, has computer executable logic that when executed by a processor causes the computer system to receive a selection of a geographic point from a user, search the database to find images that contain the selected point, and make the images that contain the selected point available to the user. Alternatively, the database may store captured oblique images without the detected edge data, and the edges within such images can be detected in real-time as the user is viewing the image(s).

In one embodiment, a sequence of instructions is stored on at least one non-transitory computer readable medium for running on a computer system capable of displaying and navigating imagery. Referring now to the drawings, and in particular to FIG. 1, in general, a User downloads a geo-referenced image as in step 10. The sequence of instructions optionally includes instructions for locating and selecting a user-requested region of interest (ROI) from a downloaded geo-referenced image as in step 12. Further instructions can be provided for magnifying the user-requested region of interest (ROI) to provide a magnified region of interest (MROI) and for performing edge detection procedures on the region of interest (ROI) to provide a detected edge DE as in step 14. However, detected edge data indicative of the detected edge DE can be provided in the downloaded image. The detected edge DE can be either a linear edge or a non-linear edge. In step 16, instructions cause the cursor to snap-to a detected edge (DE) when the User moves the cursor over the MROI and the cursor nears the DE. Further instructions allow the User to determine points of interest (POI) on a selected DE as in step 18. It is known that accuracy of selection of a POI of an element in a digital photographic image can be improved by magnifying the ROI so that the User may select a point as close as humanly possible to the actual edge of the element. However, computerized edge detection is more accurate for determination of an edge of an element and it provides consistency between multiple Users and interactions with the image. It has been discovered that by combining magnification of the ROI with edge detection, ED, and a snap-to utility for the cursor to snap to the detected edge, one can obtain synergistic improvements in the accuracy, precision and consistency of measurements of and between objects depicted within the digital photographic image as in step 20.

Figure 2:
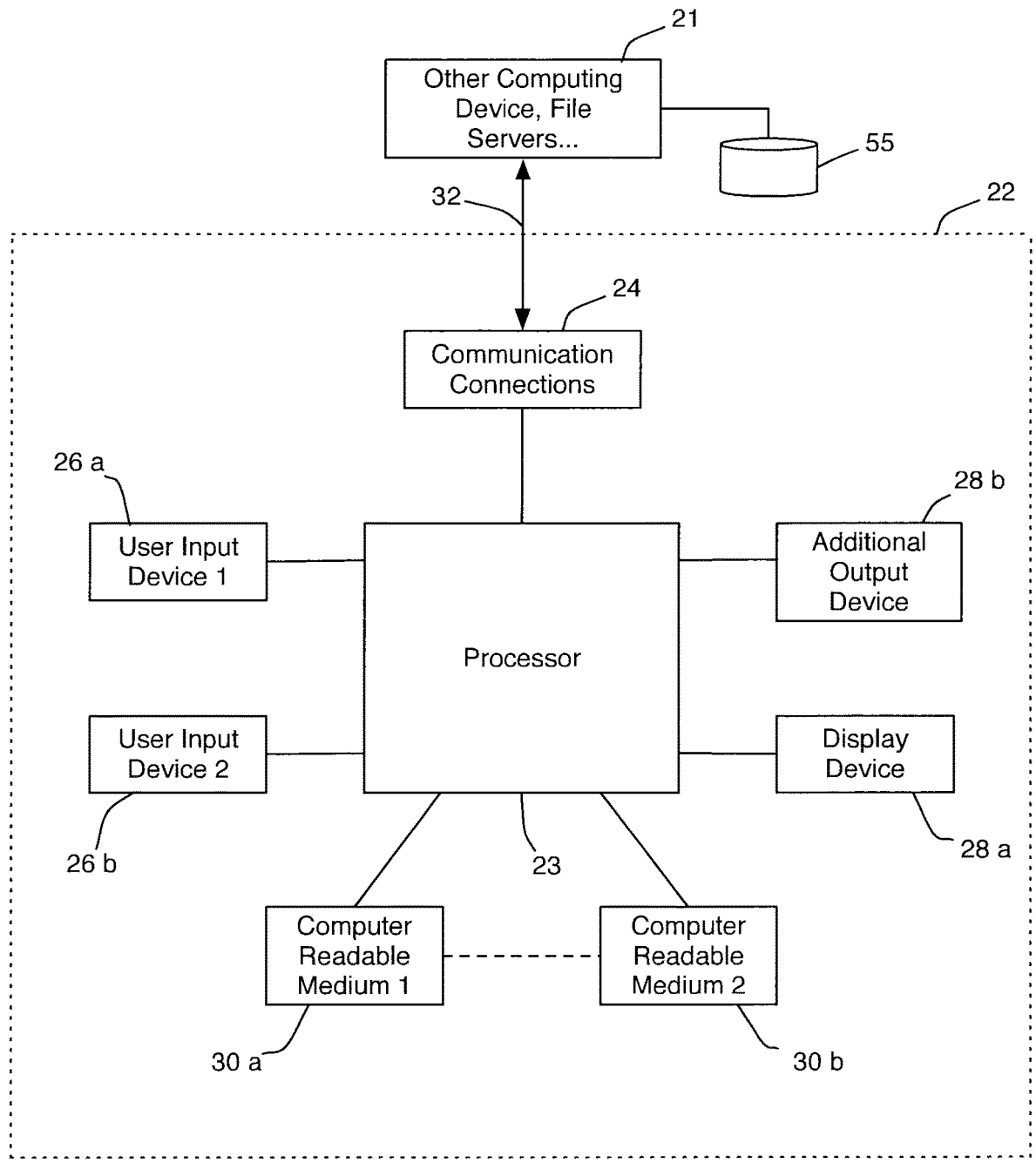
FIG. 2 is a block diagram of an exemplary computer system in accordance with the present disclosure.

Referring now to FIG. 2, the User preferably interacts with a first computer system 21 to view and download one or more geo-referenced images to a second computer system 22 (although the geo-referenced images can be stored locally). The first and second computer system 21 and 22 can be a stand-alone computer, one or more computing device(s) and/or a distributed computing system. The stand-alone computer can be a personal computer such as a conventional desktop personal computer, laptop computer or tablet, or a mobile computer terminal. The second computer system 22 preferably includes one or more processor 23, communication connections 24, input devices 26*a* and 26*b*, output devices 28*a* and 28*b* including a display device 28*a*, and at least one computer readable medium 30*a* and 30*b*. The first computer system 21 can be constructed in a similar manner as the second computer system 22. While the geo-referenced image is often provided by downloading from an Internet site, the geo-referenced image can be provided by accessing any source of data files having image files and positional data corresponding to the images. Image-capturing and geo-locating systems can include image capturing devices, such as, for example, conventional cameras, digital cameras, digital sensors, charge-coupled devices, or other suitable image-capturing devices capable of capturing images photographically or electronically, and positioning information provided by, for example, a global positioning system and/or an inertial navigation unit. These systems and devices are well known to those skilled in the art.

The image display and analysis software can be stored on a non-transitory computer readable medium and/or executed by the first and/or the second computer systems 21 and 22. Software providing instructions for displaying a pixel representation of image are available commercially and well known to those skilled in the art. Image display and analysis software can include methods for utilizing oblique images such as described in U.S. Pat. No. 7,787,659, the content of which is incorporated herein by reference.

The computer readable mediums 30a and/or 30b includes, for example, non-volatile read only memory, random access memory, hard disk memory, removable memory cards and/or other suitable memory storage devices and/or media. Input devices 26a and 26b, such as, for example, a mouse, keyboard, joystick, or other such input device, enable the input of data and interaction of a User with image display and analysis software being executed by the first and/or the second computer systems 21 and 22. In one embodiment, the first computer system 21 executes the image display and analysis software, and the second computer system 22 executes a communication software package, such as a web browser, to communicate with the first computer system 21 and display the geo-referenced images. An output device such as display device 28a can include, for example, a liquid crystal display or cathode ray tube, and displays information to the User of the second computer system 22. Additional output devices 28b can include a second display device, printer, speaker, etc. Communication connections 24 connect the second computer system 22 to a network 32, such as, for example, a local-area network, a wide-area network, the Internet and/or the World Wide Web for establishing communication with the first computer system 21.

Figure 3:
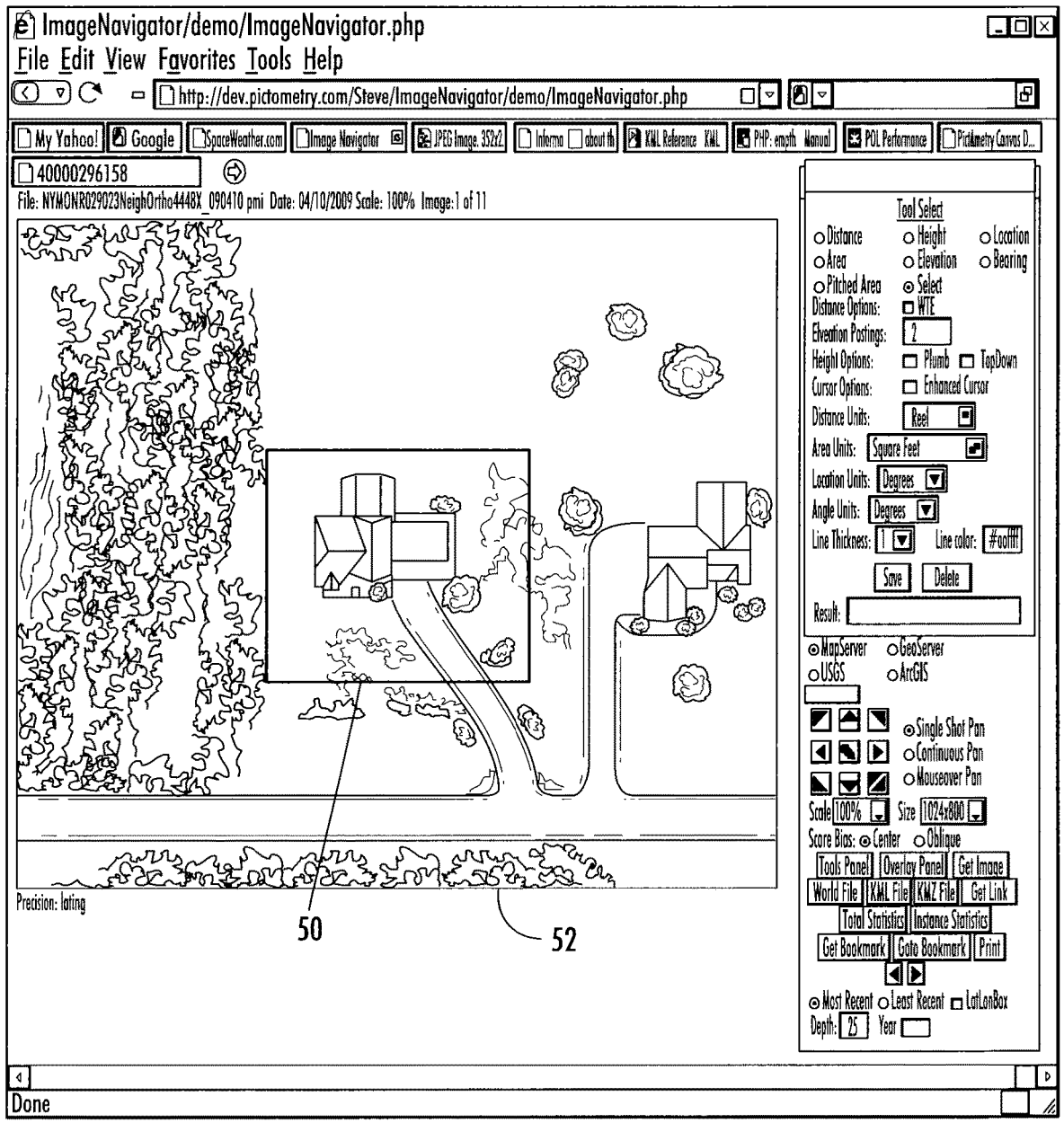
FIG. 3 illustrates an exemplary selection of a region of interest on an image.
Figure 4:
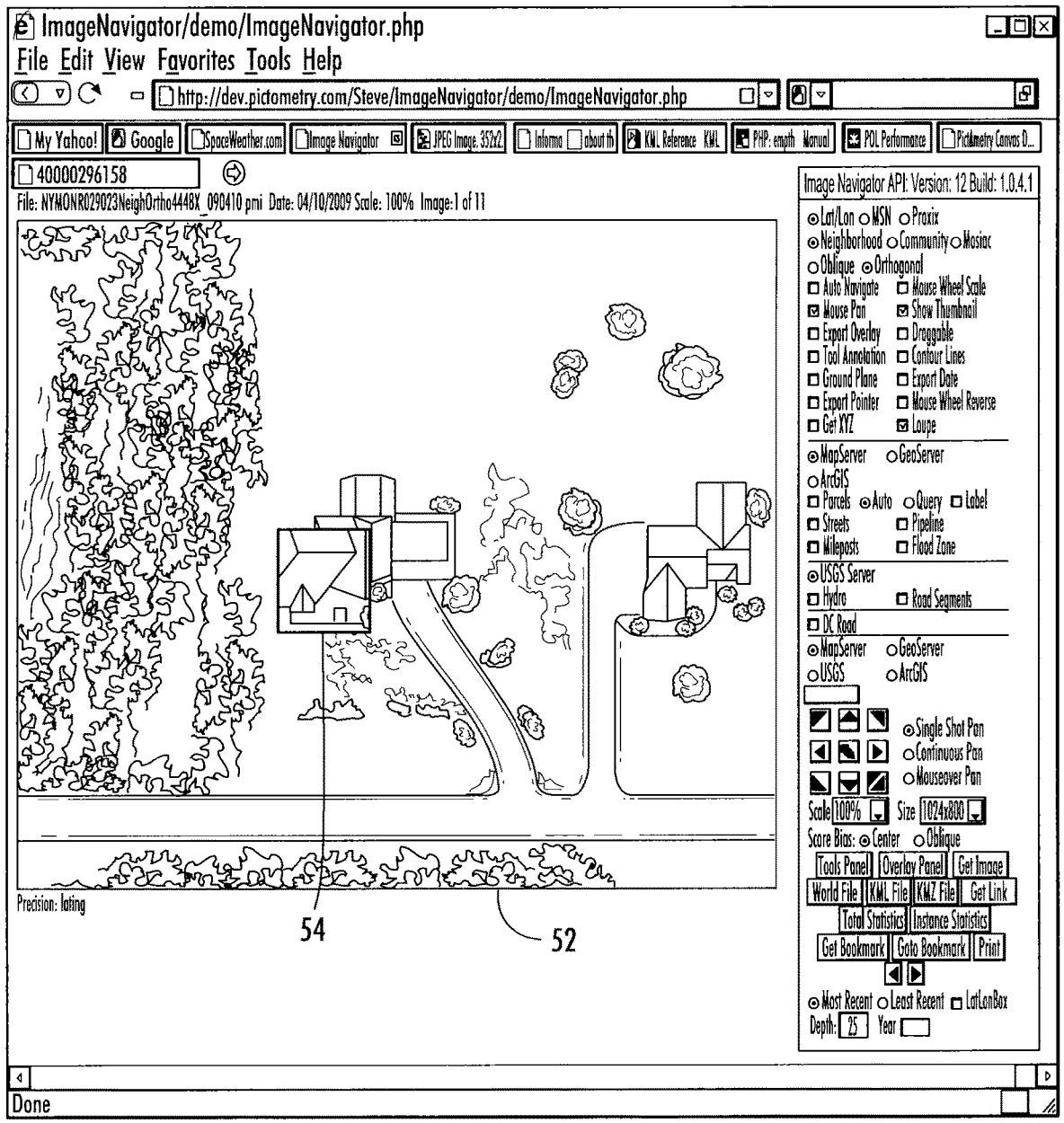
FIG. 4 illustrates an exemplary magnification of the region of interest on an image such that the magnified region of interest is a subset of the entire image and unmagnified surrounding areas are still visible to the User.

The second computer system 22 typically uses a computer monitor as a display device 28a. These display devices often cannot display an entire image with the detail necessary. This may be due to the resolution of the information in the image and the resolution and size of the display surface. When a full image is not displayable on the monitor in its entirety, the displayable image which is substituted for the full image is often a global image, i.e. the full image with resolution removed to allow the entire image to fit onto the display surface of the display device. Referring now to FIG. 3 and FIG. 4, to obtain the detail necessary to select a point of interest (POI), algorithms and software have been developed to allow the User to box out a sub-region or region of interest ROI 50 of a photograph or full image 52 and zoom-in or enlarge that sub-region as a magnified region of interest MROI 54, thus allowing the User to select points and lines from an enlarged detail image with greater ease and accuracy.

The detail image or magnified region of interest MROI 54 shows the details of the region of interest ROI 50, but when shown alone the global contexts of the details are lost. Thus, in one embodiment, instructions and algorithms known to those skilled in the art are utilized for magnifying a user-requested region of interest (ROI) 50 from the image 52 and displaying the full image or a portion thereof, along with a subsection of the display screen showing a linear magnification of the user-requested ROI 50. This allows for magnification of a particular ROI in an image while preserving visibility of the larger image as shown in FIG. 4.

In some applications, a non-linear magnification of the user-selected ROI 50 may be provided so that the connection between the detail image and the immediately surrounding portion of the global image is not obscured. Such methods are also known to those skilled in the art. While non-linear magnification creates a "lens" like distortion to the original image, it still provides increased detail for the ROI 50 while maintaining the connection to the immediately surrounding portion of the global image.

The User typically interprets the image and decides which features are to be measured. By positioning, for example, a mouse cursor, the approximate location of the features can be pointed out to an algorithm. Semi-automatic feature extraction is known to those skilled in the art and is used for measuring height points as well as for measuring specific object corners. A User positions the cursor at some position in the image 52 and the cursor snaps-to the desired surface or object corner. However, the image around this selected point will usually contain gray value gradients caused by the object edges. Thus the snap-to feature may be limited by the size and quality of the pixels.

The extraction of lines from digital images has also been researched for many years. Semi-automatic algorithms have been developed, for example, for the extraction of roads. Most algorithms of this kind are based on so-called "snakes". Extraction of objects like house roofs can be improved by algorithms that extract homogeneous gray value. The algorithms used to find the boundaries of a homogeneous area are usually based on a "region growing algorithm". A common interactive approach is to allow the User to select an appropriate object model, and approximately align the object model with the image. A fitting algorithm can then be used to find the best correspondence between edges of the object model and the location of high gradients in the image.[1]

Figure 5:
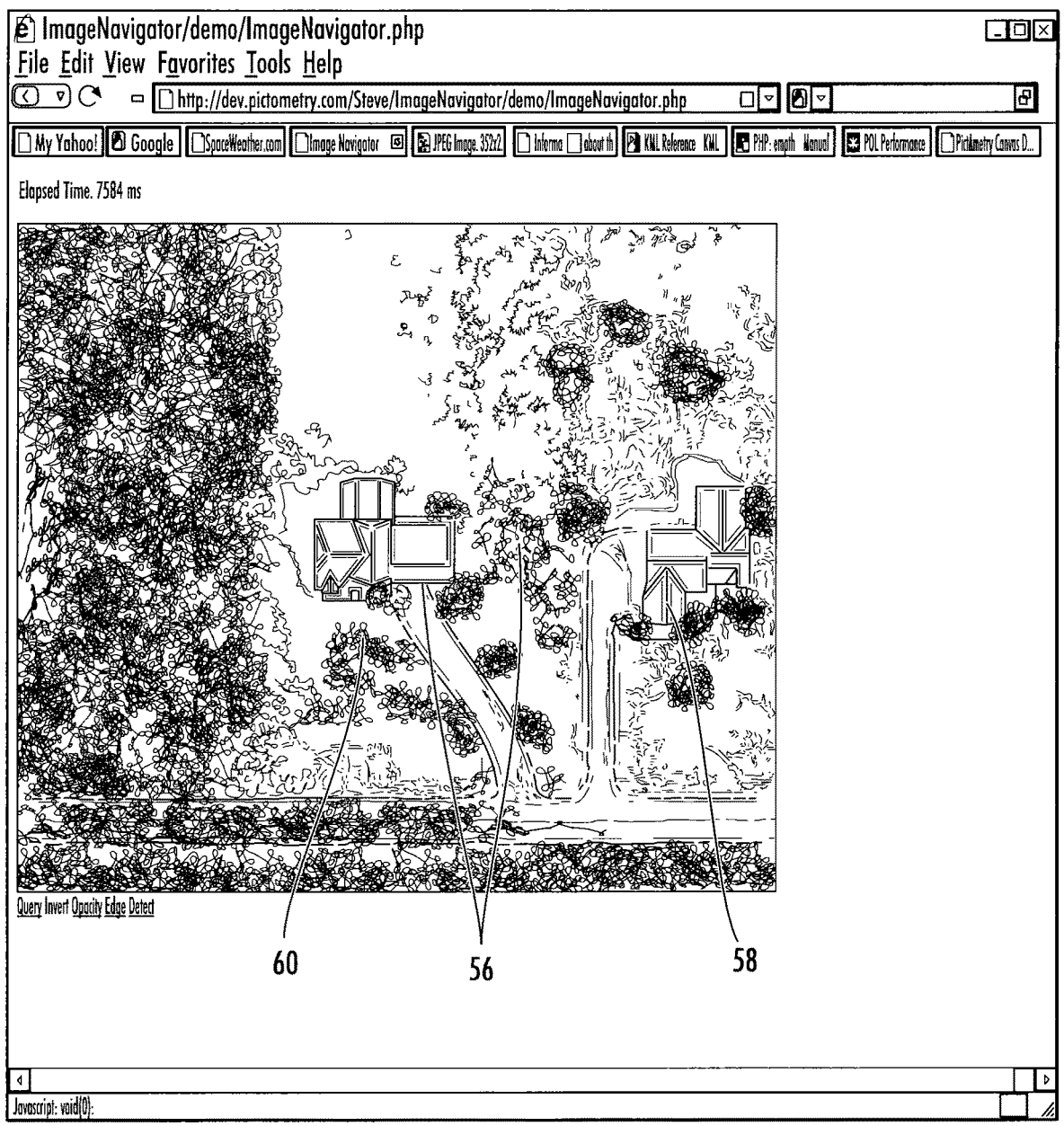
FIG. 5 illustrates an exemplary image showing numerous detected edges.

In an embodiment of the present disclosure, the sequence of instructions stored on at least one computer readable medium 30a, 30b and/or computer readable medium 55 of the first computer system 21 for running on the first and/or second computer systems 21 and 22 capable of displaying and navigating digital imagery includes instructions for performing edge detection procedures on the user-requested region of interest and/or on the entire pixel representation of the image. Referring now to FIG. 5, detected edges 56 can include linear edges 58 as well as curved edges 60. Edge detection is a tool in image processing which identifies discontinuities in a digital image such as points at which the image brightness or color changes sharply. Techniques, procedures and algorithms for edge detection are available commercially and known to those skilled in the art.

Figure 6:
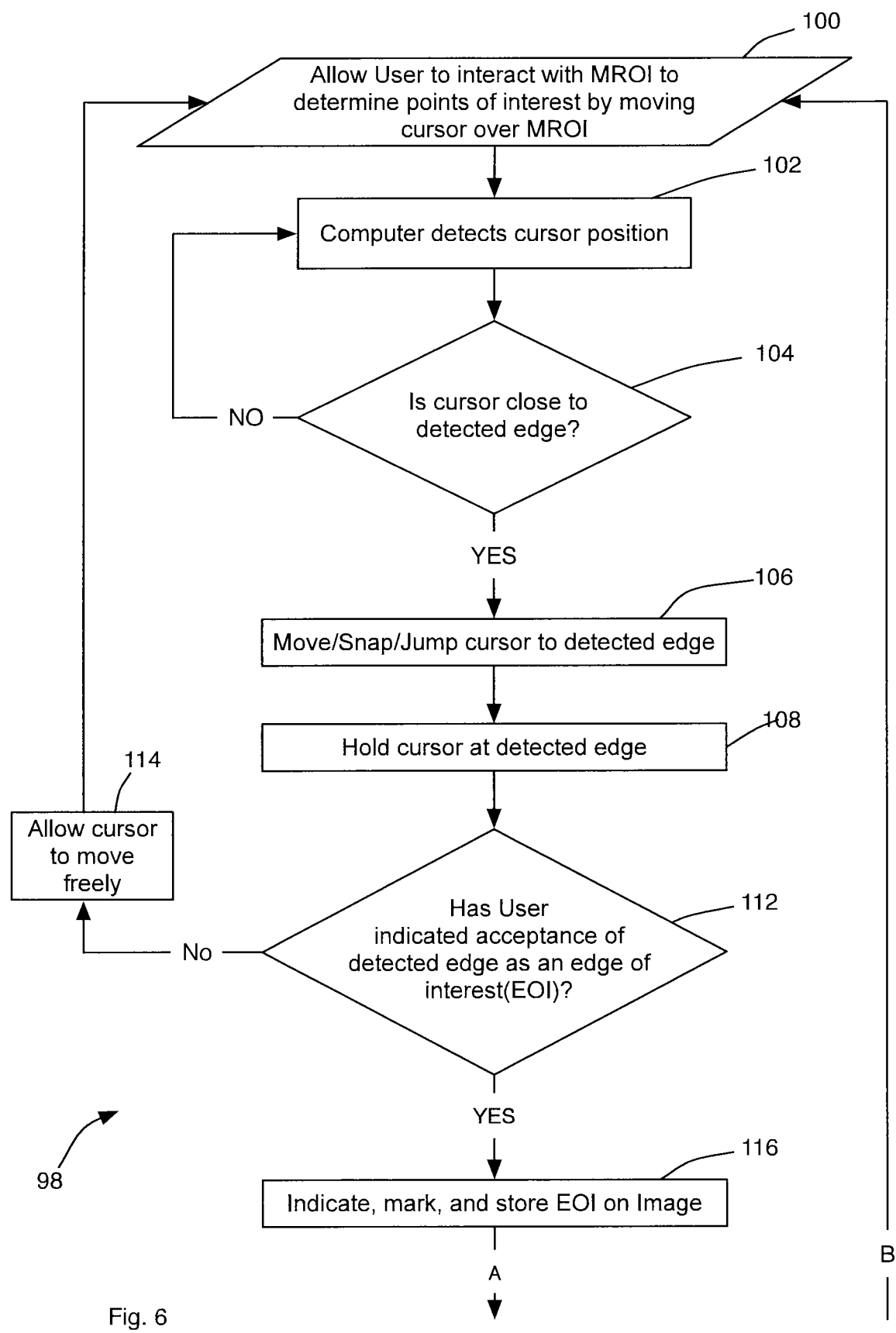
FIG. 6 is a flow chart describing a User selection of an edge of interest in an embodiment of the invention.

Referring now to FIG. 6, the sequence of instructions stored on the computer readable mediums 30a, 30b and/or 55 forms a process 98 as discussed below. The process 98 includes instructions for allowing the User to interact with the magnified region of interest MROI 54 as shown in a step 100 to determine points of interest by moving the cursor over the MROI 54. The User interaction can be accomplished with a mouse, touchpad, stylus or other means. Then the first and/or the second computer systems 21 and 22 detect a cursor position as indicated at a step 102. Once the first and/or the second computer systems 21 and 22 detects the cursor position, instructions cause the one or more processor 23 to determine the distance between the cursor and a detected edge DE 56 at a step 104. If the distance is less than a predetermined distance, for example, within 3 pixel lengths, the cursor is caused to snap-to that detected edge DE 56 at a step 106. Snap-to algorithms are known to those skilled in the art.

Figure 8:
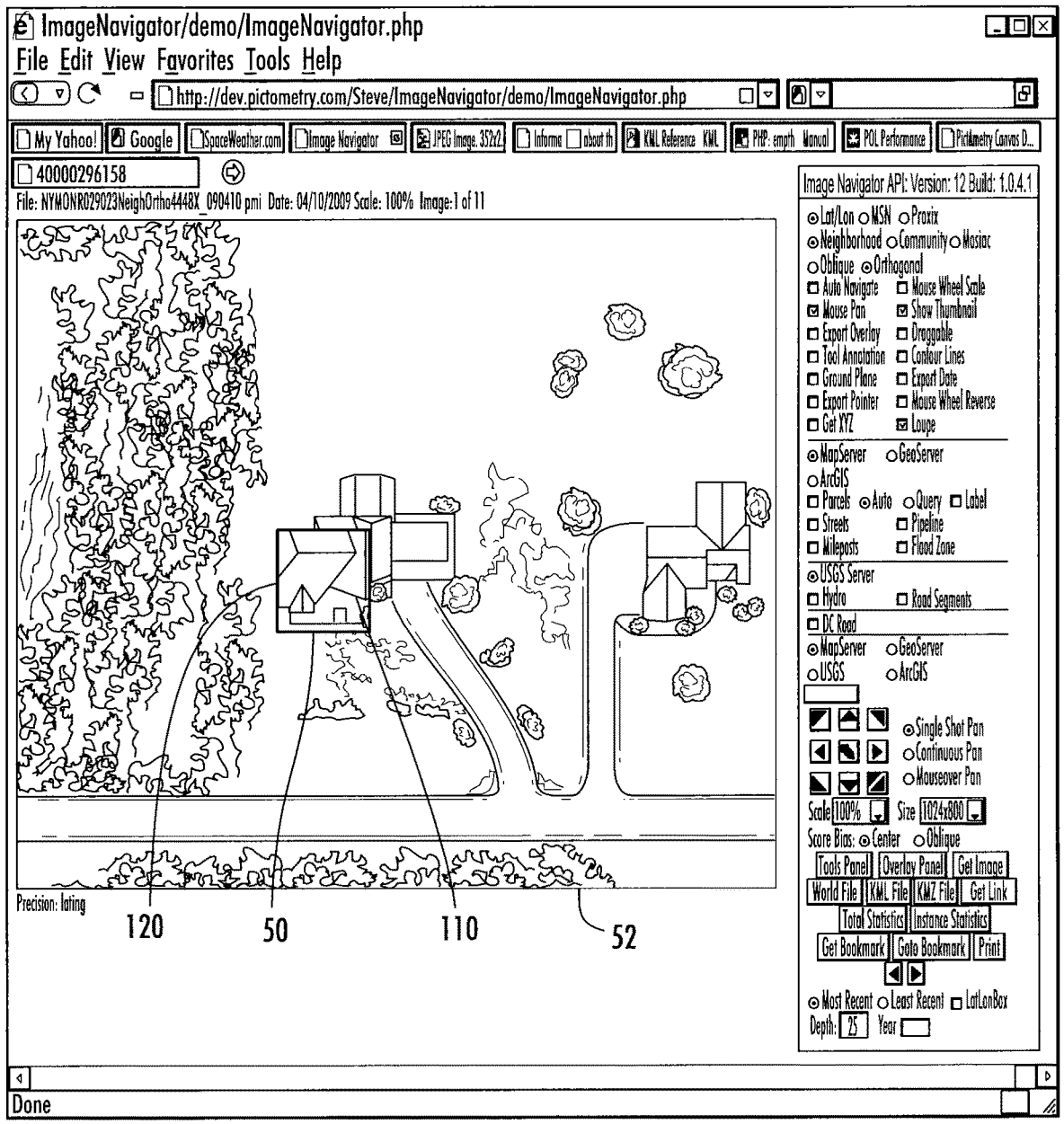
FIG. 8 illustrates an image showing a selected edge of interest and selected points of interest.

In an embodiment, instructions are provided at a step 108 to hold the cursor at the detected edge DE 56 until the User indicates acceptance or rejection of the detected edge DE 56 as an edge of interest EOI 110 at a step 112. Upon rejection, the cursor is allowed to move freely at a step 114 and the process 98 branches to the step 100 until the cursor position is detected again within a predetermined distance of the same or another detected edge DE 56, at which point the cursor will again snap-to the detected edge DE 56. Upon acceptance of the detected edge DE 56 as an edge of interest EOI 110, the process 98 includes instructions at a step 116 to indicate, mark and store the accepted edge of interest EOI 32 on the image 52 as shown, for example, in FIG. 8. Acceptance can be indicated by any means of communication with the second computer system 22, such as, for example, by clicking the mouse or by selecting "Accept" from an opened dialog box. Rejection can be indicated similarly or by lack of acceptance for a specified time.

Figure 7:
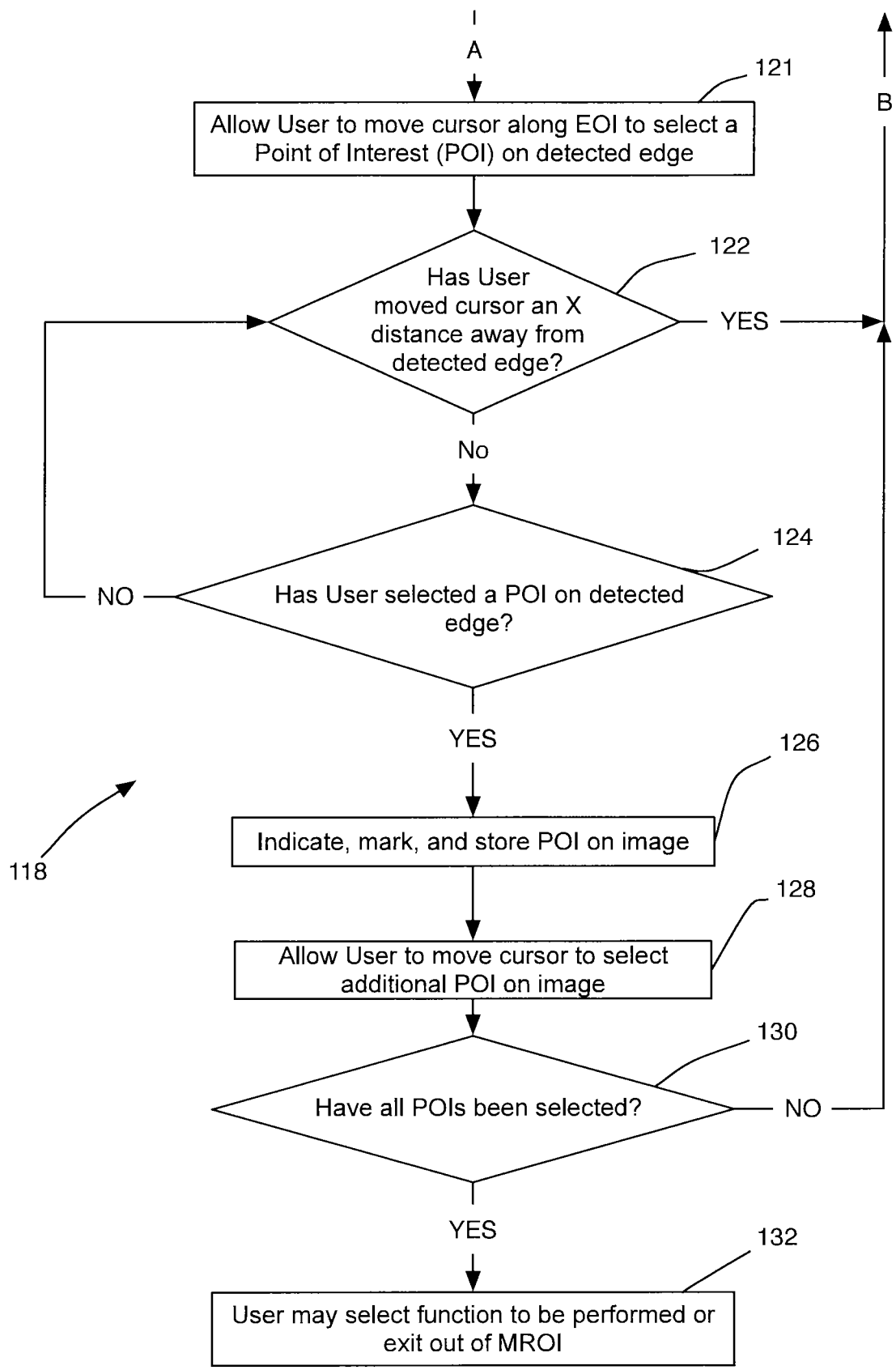
FIG. 7 is a flow chart describing a User selection of a point of interest in an embodiment of the invention.

Referring now to FIG. 7, the sequence of instructions stored on the computer readable mediums 30a, 30b and/or 55 forms a process 118 as discussed below for proceeding once the User has accepted an edge of interest EOI 110. The process 118 includes instructions for allowing the User to move the cursor along the edge of interest EOI 110 as in a step 121 in order to select a point of interest POI 120. The first and/or the second computer systems 21 and 22 detects the cursor position, and determines whether the cursor is more or less than a predetermined distance from the edge of interest EOI 110 as in a step 122. If the cursor has moved more than the predetermined distance from the edge of interest EOI 110, the process 118 branches back to step 100 in process 98. If the cursor has moved less than the predetermined distance from the edge of interest EOI 110, the User may select a point of interest POI 120 along the detected edge DE forming the edge of interest 110. At a step 124 the User may select a point of interest POI 120 and accept or reject the POI by, for example, double clicking a mouse or by any means of communication with the second computer system 22 as described above for accepting or rejecting the edge of interest EOI 110. If the point of interest POI 120 is rejected, the process 118 branches back to step 122. Upon acceptance of the point of interest POI 120, instructions are provided in a step 126 to indicate, mark and store the accepted point of interest POI 120 on the image as shown, for example, in FIG. 8.

The User is then allowed to move the cursor in a step 128 in order to select additional points of interest POI 120. The process 118 queries the User at a step 130 regarding whether all of the points of interest POI 120 have been selected. The User can indicate by any means of communication with the second computer system 22, such as, for example, by selecting "All Done" or "Continue" from an opened dialog box. If additional points of interest POI 120 are desired, process 118 branches back to step 100 of process 98 and additional points of interest POI 120 can be identified using the procedure described above until the User has selected all of the points of interest POI 120 necessary to perform a desired function. If in fact, the User has selected all the necessary points of interest POI 120, the User may select a function to be performed or exit out of the magnified region of interest MROI 54 as in a step 132.

Often, the User takes measurements of and between objects depicted in the image 52 by selecting one of several available measuring modes provided within the image display and analysis software. The User selects the desired measurement mode by accessing, for example, a series of pull-down menus or toolbars or via keyboard commands. The measuring modes provided by image display and analysis software may include, for example, a distance mode that enables measurement of the distance between two or more selected points, an area mode that enables measurement of the area encompassed by several selected and interconnected points, a height mode that enables measurement of the height between two or more selected points, and an elevation mode that enables the measurement of the change in elevation of one selected point relative to one or more other selected points.

After selecting the desired measurement mode, the User selects a starting point of interest POI 120 and an ending point of interest POI 120' on the image 52, and image display and analysis software automatically calculates and displays the quantity sought. The accuracy, precision and consistency of these measurements depend in great part on the procedure used to select the points of interest POI 120. By combining edge detection procedures with a snap-to function in a magnified region of interest, edges of interest can be identified and individual points of interest along those edges can be selected in a much more accurate and consistent manner than is currently available.

In one embodiment disclosed herein, edge detection procedures are performed on the plurality of geo-referenced images to identify edges and produce geo-referenced, edge-detected images which are saved in a database on one or more of the computer readable mediums 30a, 30b and 55. Either the first and/or the second computer system 21 and 22 storing such a database of captured oblique images having corresponding geo-location data and corresponding detected edge data, has computer executable logic that when executed by a processor causes the computer systems 21 and/or 22 to receive a selection of a geographic point from a user, search the database to find images that contain the selected point, and make the images that contain the selected point available to the user. Alternatively, the database may store captured oblique images without the detected edge data, and the edges within such images can be detected in real-time as the user is viewing the image(s) and/or when the MROI 54 is showing details of a region of interest 50.

As it will be appreciated by persons of ordinary skill in the art, changes may be made in the construction and the operation of the various components, elements and assemblies described herein or in the steps or the sequence of steps of the methods described herein without departing from the spirit and scope of the inventive concept(s) disclosed herein.

From the above description, it is clear that the inventive concept(s) disclosed herein is well adapted to carry out the objects and to attain the advantages mentioned herein as well as those inherent in the inventive concept(s) disclosed herein. While presently preferred embodiments of the inventive concept(s) disclosed herein have been described for purposes of this disclosure, it will be understood that numerous changes may be made which will readily suggest themselves to those skilled in the art and which are accomplished within the spirit of the inventive concept(s) disclosed and claimed herein.

REFERENCES (1) George Vosselman, "Cartographic Feature Extraction", Delft University of Technology, Delft, The Netherlands.

What is claimed is:
1. A method, comprising the steps of:
capturing image data and positional data corresponding to the image data;
transforming the image data and positional data into a plurality of geo-referenced images with a computer system;

transforming the geo-referenced images into geo-referenced, edge-detected images by performing edge detection procedures on the plurality of geo-referenced images to identify edges with the computer system;
saving the geo-referenced, edge-detected images in a database, the database storing detected edge data corresponding to the geo-referenced, edge-detected images;
displaying one or more pixel representation of the geo-referenced, edge-detected images to a user, wherein a detected edge of the detected edge data is superimposed on the geo-referenced, edge-detected images;
receiving a selection of one or more points on the detected edge from the user selecting the one or more points on the detected edge on a display device displaying the detected edge superimposed on the one or more pixel representation of the geo-referenced, edge-detected images; and
measuring one or more objects or between one or more objects within the geo-referenced, edge-detected image using the selected one or more points on the detected edge.

2. A method, comprising the steps of:
transforming image data of oblique images and positional data corresponding to the image data into a plurality of geo-referenced images;
transforming the geo-referenced images into geo-referenced, edge-detected images by performing edge detection procedures on the plurality of geo-referenced images to identify edges;
storing a database of the geo-referenced, edge-detected images, the database storing detected edge data corresponding to the geo-referenced, edge-detected images;
receiving a selection of a geographic point from a user;
searching the database to find geo-referenced, edge-detected images that contain the selected geographic point;
making the geo-referenced, edge-detected images that contain the selected geographic point available to the user;
receiving input from the user of a selection of one or more of the identified edges, the input determined by the user moving a cursor over a pixel representation of one or more of the geo-referenced, edge-detected images having a detected edge of the detected edge data superimposed on the pixel representation, wherein the cursor is caused to snap-to the detected edge when the cursor is within a predetermined distance from the detected edge;
receiving input from the user to affirmatively accept the detected edge as an edge of interest;
receiving a selection of one or more points on the edge of interest; and
measuring one or more objects or between one or more objects within the geo-referenced, edge-detected image using the selected one or more points.

3. The method of claim 2, further comprising the step of holding the cursor at the detected edge until the user has indicated acceptance or rejection of the detected edge as an edge of interest.

4. The method of claim 2, further comprising the steps of indicating, marking, and storing the edge of interest on the image.

5. The method of claim 2, wherein receiving the selection of one or more points on the edge of interest comprises receiving input from the user indicative of two or more points of interest along one or more of the edges of interest; and wherein measuring one or more objects or between one or more objects within the geo-referenced, edge-detected image using the selected one or more points comprises measuring a distance between the two or more points of interest utilizing the image data and positional data of the geo-referenced, edge-detected image.

6. A system for preparing and utilizing geo-referenced images, the system comprising:
image display and analysis software stored on a non-transitory computer readable medium and executable by a computer system to cause the computer system to:
transform image data of oblique images and positional data corresponding to the image data into a plurality of geo-referenced images;
transform the geo-referenced images into geo-referenced, edge-detected images by performing edge detection procedures on the plurality of geo-referenced images to identify edges;
store a database of the geo-referenced, edge-detected images, the database storing detected edge data corresponding to the geo-referenced, edge-detected images;
receive a selection of a geographic point from a user;
search the database to find geo-referenced, edge-detected images that contain the selected geographic point;
make the geo-referenced, edge-detected images that contain the selected geographic point available to the user;
receive input from the user of a selection of one or more of the identified edges, the input determined by the user moving a cursor over a pixel representation of one or more of the geo-referenced, edge-detected images having a detected edge of the detected edge data superimposed on the pixel representation, wherein the cursor is caused to snap-to the detected edge when the cursor is within a predetermined distance from the detected edge;
receive input from the user to affirmatively accept the detected edge as an edge of interest;
receive a selection of one or more points on the edge of interest; and
measure one or more objects or between one or more objects within the geo-referenced, edge-detected image using the selected one or more points on the edge of interest.

7. The system of claim 6, further comprising image display and analysis software stored on the non-transitory computer readable medium and executable by the computer system to cause the computer system to hold the cursor at the detected edge until the user has indicated acceptance or rejection of the detected edge as an edge of interest.

8. The system of claim 6, image display and analysis software stored on the non-transitory computer readable medium and executable by the computer system to cause the computer system to indicate, mark, and store the edge of interest on the image.

9. The system of claim 6, wherein to receive a selection of one or more points on the edge of interest comprises to receive input from the user indicative of two or more points of interest along one or more of the edges of interest; and wherein to measure one or more objects or between one or more objects within the geo-referenced, edge-detected image using the selected one or more points comprises to measure a distance between the two or more points of interest utilizing the image data and positional data of the geo-referenced, edge-detected image.

* * * * *